United States Patent [19]

Stevens et al.

[11] 4,360,653

[45] Nov. 23, 1982

[54] POLYMERIZATE OF (ALLYL CARBONATE) AND ALIPHATIC POLYURETHANE HAVING ACRYLIC UNSATURATION

[75] Inventors: Henry C. Stevens, Akron; Edward J. Sare, Clinton; Mark S. Holtman, Macedonia, all of Ohio

[73] Assignee: PPG Industries, Inc., Pittsburgh, Pa.

[21] Appl. No.: 314,267

[22] Filed: Oct. 23, 1981

[51] Int. Cl.$^3$ .................. C08F 26/02; C08L 75/04; C08L 75/08
[52] U.S. Cl. ............................. 526/301; 525/404; 525/455; 525/920; 526/314
[58] Field of Search .............. 526/301, 314; 525/404, 525/455, 920

[56] References Cited

U.S. PATENT DOCUMENTS

| | | | |
|---|---|---|---|
| 3,297,745 | 1/1967 | Fekete | 526/301 |
| 3,872,042 | 4/1975 | Bond | 260/23 AR |
| 3,907,865 | 9/1975 | Miyata | 526/301 |
| 3,979,426 | 9/1976 | Demajistre | 260/404.5 |
| 4,017,646 | 4/1977 | Demajistre | 427/44 |
| 4,125,671 | 11/1978 | Magazzu | 428/419 |
| 4,199,526 | 4/1980 | Senet | 526/301 |

*Primary Examiner*—Paul Lieberman
*Attorney, Agent, or Firm*—Richard M. Goldman

[57] ABSTRACT

Discloses a monomeric composition of a polyol(allyl carbonate) and a polyurethane having terminal acrylate functionality, and a polymer thereof.

24 Claims, No Drawings

POLYMERIZATE OF (ALLYL CARBONATE) AND ALIPHATIC POLYURETHANE HAVING ACRYLIC UNSATURATION

DESCRIPTION OF THE INVENTION

Polmerizates of aliphatic polyol(allyl carbonate) are characterized by hardness, impact resistance, and optical clarity. However, for certain applications, increased impact resistance and hardness are desirable. In the past, it has not been possible to obtain these desired properties without degradation of other properties, for example, without increased yellowing, and haze.

It has now been found that a polymerizate of an aliphatic diol bis(allyl carbonate) having increased impact strength and substantially no degradation in optical properties or increase in yellowing may be prepared by the addition of a poly carbamic ester, i.e., a polyurethane, having terminal acrylate functionality. It has further been found that a copolymerizate of polyol(allyl carbonate) and an acrylate capped monomer, prepolymer, oligomer, or low molecular weight polymer having internal polyurethane functionality exhibits enhanced impact strength, and substantially no increased yellowing when compared with a homopolymerizate of polyol(allyl carbonate).

DETAILED DESCRIPTION OF THE INVENTION

It has now been found that the addition to a monomeric polyol(allyl carbonate) of a high molecular weight monomer, oligomer, prepolymer, or polymer having a molecular weight below about 3500, characterized by internal polyurethane bonds and terminal acrylate functionality increases the impact strength of the polyol(allyl carbonate) polymerizate without increased yellowing. It has further been found that a copolymerizate of diol bis(allyl carbonate) with a high molecular weight monomer, oligomer, or low molecular weight polymer or prepolymer having internal polyurethane functionality and terminal acrylate functionality has higher impact strength than an equivalent polyol(allyl carbonate) homopolymer.

According to the method herein contemplated, an effective amount of a material having internal polyurethane functionality and terminal acrylate functionality is added to a polyol(allyl carbonate) monomer, whereby to provide a liquid composition of a major portion of polyol(allyl carbonate) monomer and a minor portion of the material having internal polyurethane functionality and terminal acrylate functionality. The resulting liquid composition is polymerized, e.g., by free radical initiated polymerization through the allyl and acrylate functionality to provide a copolymerizate of a major portion of polyol(allyl carbonate) and a minor portion of the material having internal polyurethane functionality, i.e., polyurethane material.

By an effective amount of the acrylated polyurethane material is meant an amount sufficient to provide a measurable enhancement of impact strength. This is at least about 3 weight percent, and generally above about 10 weight percent. However, the amount should be below about 50 weight percent and preferably below about 40 weight percent in order to retain the desired optical properties and chemical resistance of the polyol(allyl carbonate). It has generally been found that a loading of in excess of about 10 weight percent of the terminal acrylate polyurethane provides a significant increase in average impact strength relative to that of the polyol(allyl carbonate) homopolymerizate, while loadings of polyurethane with terminal acrylate functionality above about 20 to 30 weight percent provide an even higher increase in the impact strength relative to that of the polyol(allyl carbonate) homopolymerizate while retaining optical transparency and clarity.

However, amounts of the acrylate terminated polyurethane above about 40 to 50 weight percent should be avoided inasmuch as at levels of the acrylate terminated polyurethane above about 40 to 50 weight percent, basis total organics, the chemical resistance of the polymerizate begins to decline relative to that of the polyol(allyl carbonate). However, higher levels of acrylate terminated polyurethane may be utilized where chemical resistance is not essential.

The terminally acrylic polyurethanes herein contemplated, including dithiocarbamyl esters, as will be described more fully hereinbelow, preferably have a molecular weight of from about 350 to about 3500, and preferably from about 500 to about 2000. Higher molecular weight terminally acrylic polyurethanes do not appear to provide sufficient acrylate activity for the degree of polymerization and cross linking desired while terminally acrylic polyurethanes having a molecular weight below about 300 do not appear to offer sufficient molecular weight or polyurethane functionality to provide the desired enhancement of the physical properties of the resulting polymerizate.

Polyol(allyl carbonate) monomers, such as diol bis(allyl carbonates), triol tris(allyl carbonates), and higher homologues, which may be copolymerized by the method of this invention are normally aliphatic liquid allyl carbonates, e.g., glycol bis(allyl carbonate) compounds, in which the allyl groups may be substituted at the 2 position with a halogen, notably chlorine or bromine, or a 1 to 4 carbon alkyl group, generally a methyl or ethyl group. For diol bis(allyl carbonates) the glycol residue may be an alkylene, alkylene ether, alkylene polyether, alkylene carbonate, or cycloahphatic group having from 2 to 10 carbons and oxygens. Exemplary diol bis(allyl carbonate) monomers are represented by the formula:

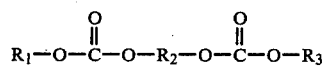

where $R_1$ and $R_3$ are allyl or substituted allyl groups, and $R_2$ is as defined below. $R_1$ and $R_3$ are independently represented by the formula:

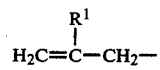

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C\!\!=\!\!CH\!\!-\!\!CH_2\!\!-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as —CH$_2$—O—CH$_2$—, —CH$_2$CH$_2$—O—CH$_2$CH$_2$—, —CH$_2$—O—CH$_2$—CH$_2$—, and —CH$_2$CH$_2$CH$_2$—O—CH$_2$CH$_2$CH$_2$—, alkylene polyether groups such as —CH$_2$CH$_2$—O—CH$_2$CH$_2$—O—CH$_2$CH$_2$—O—CH$_2$CH$_2$O—CH$_2$CH$_2$—, and —CH$_2$—O—CH$_2$— groups, alkylene carbonate groups such as CH$_2$CH$_2$—O—CO—O—CH$_2$CH$_2$ and —CH$_2$CH$_2$—O—CO—O—CH$_2$CH$_2$—O—CO—O—CH$_2$CH$_2$—O—CO—OCH$_2$CH$_2$— groups, and cyclo aliphatic groups, as 1,4 cyclohexane dimethanol bis(allyl carbonate). Most commonly, R$_2$ is —CH$_2$CH$_2$—, CH$_2$CH$_2$—O—CH$_2$CH$_2$—, or —CH$_2$CH$_2$—O—CH$_2$CH$_2$—O—CH$_2$CH$_2$—.

Specific examples of diol bis(allyl carbonate) monomers useful in carrying out the method herein contemplated include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

Commercially important diol bis(allyl carbonate) monomers which may be polymerized by the method herein contemplated are:

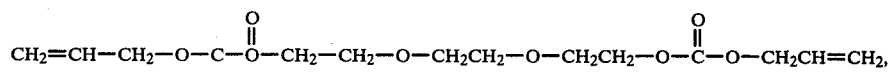

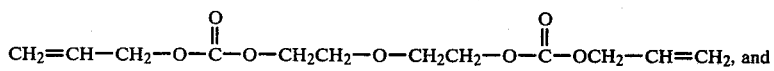

The methods of this invention may also be utilized to copolymerize 1,4 cyclohexane dimethanol bis(allyl carbonate), and to copolymerize triol tris(allyl carbonates) as described in U.S. Pat. No. 4,144,262 to Stevens for *TRIALLYL CARBONATE MONOMERS*. The polymethanes having terminal acrylic groups which can be copolymerized according to this invention are characterized by terminal acrylate groups, i.e., acrylic acid groups, methacrylic acid groups, ethyl acrylic acid groups, methyl acrylate groups, methyl methacrylate groups, ethyl methacrylate groups, or the like, and internal carbamate bonds, including dithiocarbamate bonds.

Whenever the terms "polyurethane having terminal acrylate functionality", "acrylated urethane oligomer", "acrylated carbamyl ester", or "polyacrylate having internal carbamate bonds", are used herein, they are used interchangeably and synonymously.

Whenever the terms "urethane", "carbamate", and "carbamyl" are used herein, they are intended to interchangeably and synonymously refer to the sulfur analogs, unless the contrary shall be clearly indicated by the context.

The polyurethanes having terminal acrylate functionality which can be copolymerized according to this invention are normally liquid, aliphatic diacrylate, triacrylate, and tetra acrylate polyurethanes.

According to one exemplification herein contemplated, the polyacrylate having internal polyurethane, including dithiocarbamate, functionality has the formula:

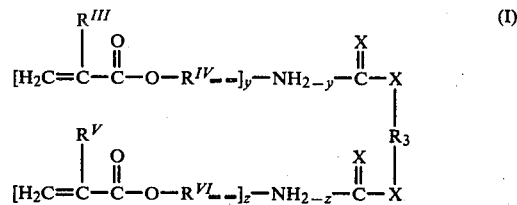

while according to an alternative exemplification, the polyacrylate having internal polyurethane functionality has the formula:

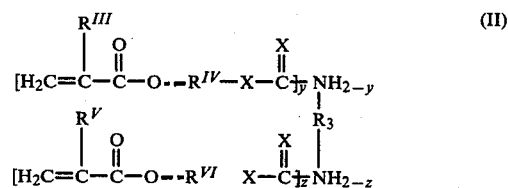

i.e.,

(IIa)

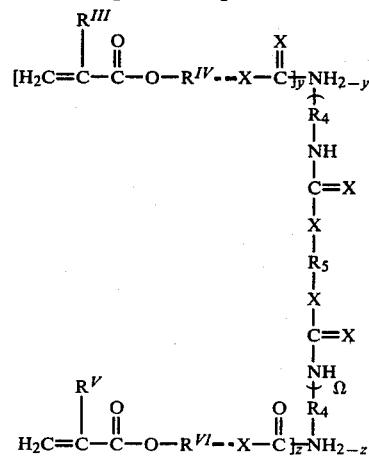

where omega is such as to provide the desired molecular weight.

In Formulae (I), (II), and (IIa) $R^{III}$ and $R^V$ are independently chosen from the group consisting of —H and —CH$_3$, $R^{IV}$ and $R^{VI}$ are independently chosen from the group consisting of C$_1$ to C$_{10}$ alkyls, including branched alkyls. Most commonly $R^{IV}$ and $R^{VI}$ are —CH$_2$CH$_2$—, y and z are independently 1 or 2, X is chosen from the group consisting of oxygen and sulfur. In Formula I R$_3$ is chosen from the group consisting of alkylene groups, alkylene ether groups, alkylene polyether groups, alkylene carbonate groups, aromatic groups, polyurethane groups, and polythiourethane groups. In Formula II $R_3$ is derived from the reactions of polyols with aliphatic and aromatic polyisocyanates, i.e., $R_3$ is a polyurethane. In Formula IIa, $R_4$ is derived from the di-isocyanate, and $R_5$ is independently a $C_2$ to $C_{10}$ alkylene group derived from the diol.

The acrylate terminated polyurethane of Formula I may be prepared by reacting two moles of an alkali metal hydroxy carbamate.

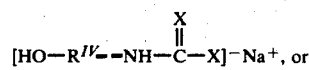

or

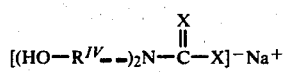

with a mole of an alkyl dichloride,

whereby to form a diol having internal carbamate bonds, including dithiocarbamate bonds,

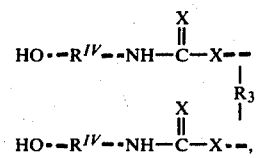

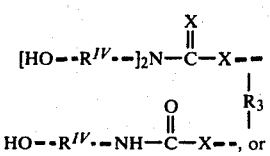

or

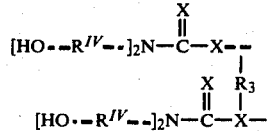

which may then be reacted with an acrylic acid.

According to one exemplification of preparing the polyacrylate of Formula I, 2-N-hydroxy ethyl carbamic acid sodium salt may be reacted with 1,5-dichloropentane to give 1,5-bis(2-N-hydroxy ethyl carbamyl) pentane,

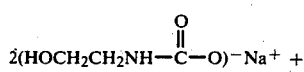

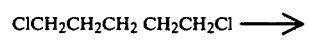

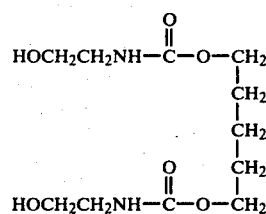

The resulting 1,5-bis(2-N hydroxy ethyl carbamyl) pentane may then be reacted with acrylic acid to give the corresponding bis(acrylate).

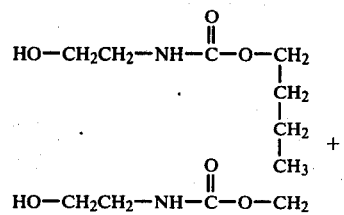

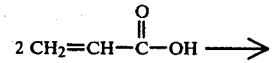

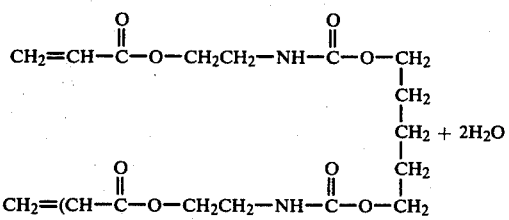

According to an alternative exemplification of preparing the polyacrylate of formula I, diethanol amine may be reacted with carbon disulfide in the presence of caustic soda to yield sodium ethyl dithiocarbamate,

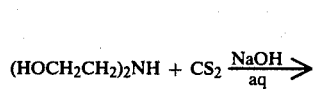

Thereafter a saturated dichloride, e.g., bis-(2-chloroethyl) formal, is added to the aqueous solution to bis-(2-hydroxyethyl) dithiocarbamyl ethyl formal,

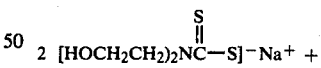

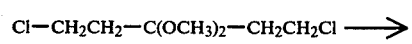

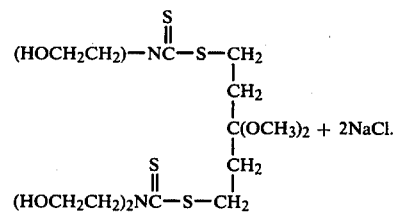

This material is then reacted with ethylacrylic acid to form bis-(2-hydroxyethyl)dithiocarbamyl ethyl formal tetraacrylate,

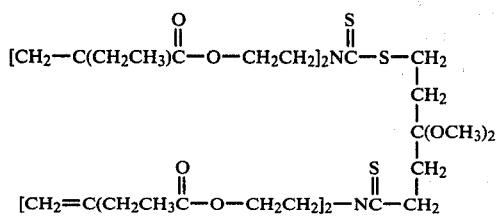

The acrylate terminated polyurethane of formula II may be prepared by various methods that are well known in the isocyanate art. For example, the acrylate terminated polyurethane of Formula II may be prepared by reacting 2 moles of a diol monoacrylate with a diisocyanate,

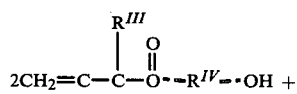

$$O=C=N-R_3-N=C=O \longrightarrow$$

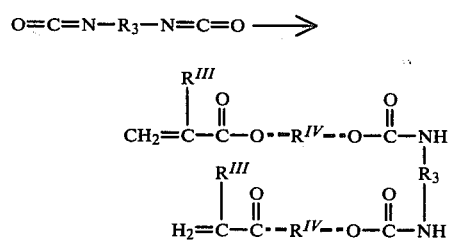

For example, ethylene glycol diisocyanate may be reacted with two moles of hydroxy ethyl acrylate to give ethylene glycol diurethane bis(ethyl acrylate),

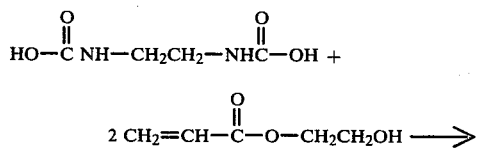

The acrylate terminated polyurethane of formula IIa may be formed by reacting an excess of a diisocyanate with a diol, whereby to form a polyurethane having terminal isocyanate functionality, e.g.,

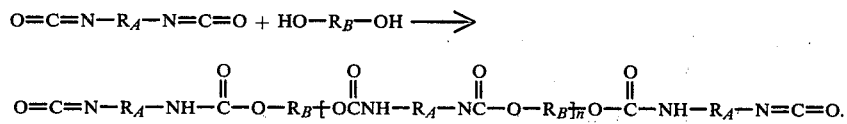

where n is 0 or an integer from 1 to 50 or more, and generally from 1 to 10. The resulting polyurethane diisocyanate, which may be synonymously referred to as a polymer, a prepolymer, or an oligomer, is thereafter reacted with a material having acrylic and hydroxyl functionality, e.g., a mono acrylate of a diol, the mono acrylate ester having hydroxyl functionality,

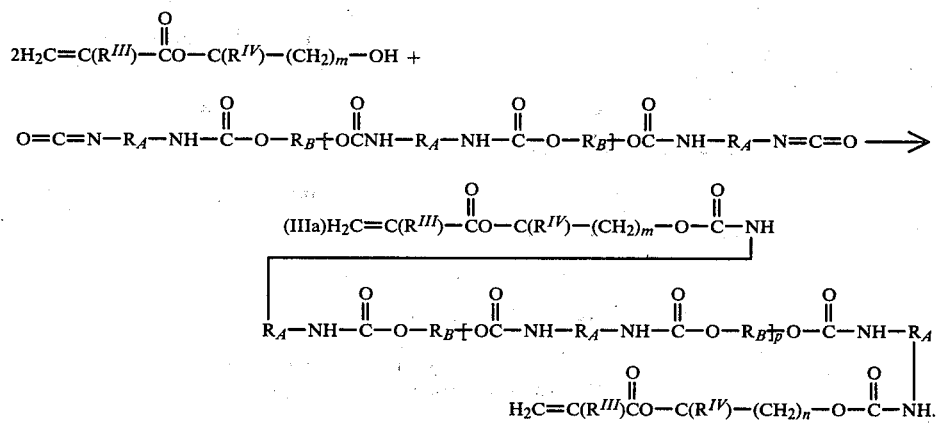

While the invention is illustrated with respect to aliphatic diol bis(allyl carbonates) and aliphatic polyurethanes having terminal acrylate functionality, it is to be understood that the cyclic and aromatic (allyl carbonates) and the cyclic and aromatic polyurethanes with terminal acrylate groups may be used. This is especially so in applications where high optical indices of refraction are required, or where some discoloration and yellowing may be tolerated.

The polymerization of the polyol (allyl carbonate) composition is initiated by the creation of active centers, e.g., free radicals. Useful free radical initiators are organic peroxy compounds. The organic peroxy compounds include: isobutyryl peroxide; di(2-ethylhexyl) peroxydicarbonate; acetyl cyclohexane sulfonyl peroxide; di(secbutyl) peroxydicarbonate; diisopropyl peroxydicarbonate; 2,4-dichlorobenzoyl peroxide, t-butyl peroxypivalate; decanoyl peroxide; lauroyl peroxide, propionyl peroxide; 2,5-dimethyl-2,5-bis(2-ethyl hexylperoxy) hexane; acetyl peroxide; succinic acid peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide, 1-hydroxy-1'-hydroperoxy dicyclohexyl peroxide; t-butyl peroxyisopropyl carbonate; 2,5-dimethyl-2,5-bis-(benzoylperoxy) hexane; t-butyl peroxyacetate; methyl ethyl ketone peroxides; di-t-butyl diperoxyphthalate and t-butyl peroxybenzoate. Also useful are diazo compounds, e.g., azo isobutyryl nitrile.

Especially preferred initiators are those that do not discolor the resulting polymerizate. Exemplary are diisopropyl peroxydicarbonate and benzoyl peroxide.

According to one particularly preferred exemplification herein contemplated, a liquid composition is prepared containing from about 80 to about 90 percent diethylene glycol bis(allyl carbanate) and balance urethane oligomer with acrylic functionality having the structure represented by representation IIa, and a molecular weight of about 1300 to about 1500. To this liquid composition is added about 3.0 weight percent diisopropylperoxydicarbonate, basis weight of the diethylene glycol bis(allyl carbonate). The composition is placed in a mold in an anerobic atmosphere, and the liquid composition is slowly heated from room temperature to about 100 degrees Centigrade over a period of 18 hours. The resulting hard polymerizate cast in the form of the mold exhibits an enhanced impact strength.

The following examples are illustrative of the method of this invention.

EXAMPLE I

A series of tests were run to determine the effect of the addition of acrylated polyurethane on the Notched Izod Strength of a diol bis(allyl carbonate) polymer.

Five sheets were prepared by casting a solution of PPG Industries, Inc. Cr-39 ® diethylene glycol bis(allyl carbonate) containing 3.5 weight percent isopropyl peroxydicarbonate between a pair of glass sheets separated by a one-eighth inch gasket. The castings were cured according to the following cure cycle:

| Elasped Time (hours) | Temperature, °C. |
| --- | --- |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

Five sheets were prepared by casting a solution of 87.5 weight percent PPG Industries, Inc. CR-39 ® diethylene glycol bis(allyl carbonate) and 12.5 weight percent Thiokol Chemical Co. UVITHANE ®-893, 1300 molecular weight diacrylated urethane oligomer, basis total monomers, and 3.5 weight percent isopropyl peroxydicarbonate, basis weight of diethylene glycol bis(allyl carbonate). The solution was cured according to the above cure cycle.

Both sets of five sheets were cut into four specimens per sheet. Each specimen was notched and subjected to an Izod Notched Impact Test. The results shown in Table I were obtained:

TABLE I

Izod Notched Impact Strengths In Foot-Pounds/Inch of One-Eighth Inch Sheets

| Sheets 1 to 5: Diethylene Glycol Bis(Allyl Carbonate) | | | | | |
| --- | --- | --- | --- | --- | --- |
| | Sheet 1 | Sheet 2 | Sheet 3 | Sheet 4 | Sheet 5 |
| Test 1 | 0.51 | 0.23 | 0.24 | 0.31 | 0.23 |
| Test 2 | 0.24 | 0.31 | 0.31 | 0.31 | 0.31 |
| Test 3 | 0.24 | 0.31 | 0.24 | 0.31 | 0.31 |
| Test 4 | 0.40 | 0.31 | 0.24 | 0.46 | 0.31 |
| Min. | 0.24 | 0.23 | 0.24 | 0.31 | 0.23 |
| Max. | 0.51 | 0.31 | 0.31 | 0.46 | 0.31 |
| Mean | 0.348 | 0.290 | 0.258 | 0.348 | 0.290 |
| Variance | 0.0174 | 0.0016 | 0.00123 | 0.00563 | 0.0016 |
| Std. Dev. | 0.132 | 0.040 | 0.035 | 0.075 | 0.040 |
| Average of 20 Tests | — | — | 0.32 | — | — |

| Sheets 6 to 10: Diethylene Glycol Bis(Allyl Carbonate) + 12.5 Weight Percent Polyurethane With Terminal Acrylate | | | | | |
| --- | --- | --- | --- | --- | --- |
| | Sheet 6 | Sheet 7 | Sheet 8 | Sheet 9 | Sheet 10 |
| Test 1 | 0.30 | 0.46 | 0.38 | 0.37 | 0.48 |
| Test 2 | 0.75 | 0.24 | 0.51 | 0.31 | 0.39 |
| Test 3 | 0.53 | 0.49 | 0.44 | 0.53 | 0.32 |
| Test 4 | 0.29 | 0.23 | — | 0.46 | 0.32 |
| Min. | 0.29 | 0.23 | 0.31 | 0.32 | 0.32 |
| Max. | 0.53 | 0.51 | 0.53 | 0.45 | 0.48 |
| Mean | 0.543 | 0.390 | 0.418 | 0.378 | 0.378 |
| Variance | 0.0828 | 0.014 | 0.009 | 0.005 | 0.005 |
| Std. Dev. | 0.288 | 0.119 | 0.097 | 0.076 | 0.076 |
| Average of 19 Tests | — | — | 0.043 | — | — |

The 35 percent increase in Izod Notched Impact Test strength was statistically significant at the 99.5 percent confidence level.

EXAMPLE II

A series of tests were run to determine the effect of the addition of acrylated urethane on the Notched Izod Strength of a diol bis(allyl carbonate) polymer.

Five sheets were prepared by casting a solution of PPG Industries, Inc. CR-39 ® diethylene glycol bis(allyl carbonate) containing 3.5 weight percent isopropyl peroxydicarbonate between a pair of glass sheets separated by a one-eighth inch gasket. The castings were cured according to the following cure cycle:

| Elapsed Time (hours) | Temperature °C. |
| --- | --- |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

Five sheets were prepared by casting a solution of 75 weight percent PPG Industries, Inc. CR-39 ® diethylene glycol bis(allyl carbonate) and 25 weight percent Thiokol Chemical Co. UVITHANE ®-893, 1300 molecular weight, diacrylated urethane oligomer, basis total monomers, and 3.5 weight percent isopropyl peroxydicarbonate, basis weight of diethylene glycol bis(allyl carbonate). The solution was cured according to the above cure cycle.

Both sets of five sheets were cut into individual specimens. Each specimen was notched and subjected to an Izod Notched Impact Test. The results shown in Table II were obtained:

TABLE II

Izod Notched Impact Strengths
In Foot-Pounds/Inch of One-Eighth
Inch Sheets

| Sheets 1 to 5: Diethylene Glycol Bis(Allyl Carbonate) | | | | |
|---|---|---|---|---|
| Sheet 1 | Sheet 2 | Sheet 3 | Sheet 4 | Sheet 5 |
| Test 1 | 0.42 | 0.41 | 0.32 | 0.40 | 0.50 |
| Test 2 | 0.25 | 0.48 | | 0.38 | 0.46 |
| Test 3 | 0.49 | 0.48 | | 0.39 | 0.47 |
| Test 4 | | 0.32 | | 0.31 | 0.38 |
| Test 5 | | 0.40 | | 0.39 | 0.55 |
| Test 6 | | 0.46 | | 0.46 | 0.46 |
| Test 7 | | | | | 0.62 |
| Test 8 | | | | | |
| Min. | 0.25 | 0.32 | 0.32 | 0.31 | 0.38 |
| Max. | 0.49 | 0.48 | 0.32 | 0.46 | 0.62 |
| Mean | 0.39 | 0.43 | 0.32 | 0.38 | 0.49 |
| Variance | 0.015 | 0.003 | — | 0.0023 | 0.0058 |
| Std. Dev. | 0.12 | 0.06 | — | 0.048 | 0.076 |
| Average | — | — | 0.43 | — | — |

| Sheets 6 to 10: Diethylene Glycol Bis(Allyl Carbonate) + 25 Weight Percent Polyurethane With Terminal Acrylate | | | | | |
|---|---|---|---|---|---|
| | Sheet 6 | Sheet 7 | Sheet 8 | Sheet 9 | Sheet 10 |
| Test 1 | 0.54 | 0.53 | 0.50 | 0.53 | 0.62 |
| Test 2 | 0.54 | 0.60 | 0.38 | 0.45 | 0.62 |
| Test 3 | 0.54 | 0.30 | 0.54 | 0.53 | 0.46 |
| Test 4 | 0.54 | 0.59 | 0.67 | 0.53 | 0.45 |
| Test 5 | 0.54 | 0.60 | 0.54 | 0.53 | 0.54 |
| Test 6 | 0.62 | 0.59 | 0.54 | 0.45 | 0.53 |
| Test 7 | 0.54 | 0.60 | 0.54 | — | 0.62 |
| Test 8 | 0.54 | | | | |
| Min. | 0.54 | 0.30 | 0.38 | 0.45 | 0.45 |
| Max. | 0.62 | 0.60 | 0.67 | 0.53 | 0.62 |
| Mean | 0.55 | 0.54 | 0.53 | 0.50 | 0.55 |
| Variance | 0.0008 | 0.012 | 0.0072 | 0.0017 | 0.0055 |
| Std. Dev. | 0.028 | 0.11 | 0.085 | 0.041 | 0.074 |
| Average | — | — | 0.54 | — | — |

The 17 percent increase in the Izod Notched Impact Strength was statistically significant at the 99.9 percent confidence level.

EXAMPLE III

A series of tests were conducted to determine the steel ball impact strength of one sixteenth inch thick sheets.

Ten sheets were prepared by casting a solution of PPG Industries, Inc. CR-39 ® diethylene glycol bis(allyl carbonate) containing 3.5 weight percent isopropyl peroxydicarbonate between a pair of glass sheets separated by a one-sixteenth inch gasket.

Ten sheets were prepared by casting a solution of 87.5 weight percent PPG Industries, Inc. CR-39 ® diethylene glycol bis(allyl carbonate) and 12.5 weight percent Thiokol Chemical Co. UVITHANE ®-893 diacrylated urethane oligomer, basis total monomers, and 3.5 weight percent isopropyl peroxydicarbonate, basis weight of diethylene glycol bis(allyl carbonate), as described above.

Ten sheets were prepared by casting a solution of 75 weight percent PPG Industries, Inc. CR-39 ® diethylene glycol bis(allyl carbonate) and 25 weight percent Thiokol Chemical Co. UVITHANE ®-893 diacrylated urethane oligomer, basis total monomers, and 3.5 weight percent isopropyl peroxydicarbonate, basis weight of diethylene glycol bis(allyl carbonate), as described above.

All of the samples were cured according to the following cure cycle:

| Elasped Time (hours) | Temperature, °C. |
|---|---|
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

Each of the sheets were tested in accordance with American National Standards Institute Z 87.1-1979. The apparatus was the same as that described in the standard at section 5.1.4.1.6., paragraph 4, except that a 1.5 inch diameter guide tube extended to within 2 inches of the sample.

The following results were obtained:

TABLE III

| | | Steel Ball Impact Test | | |
|---|---|---|---|---|
| Material | Diameter (inches) | Diethylene Glycol Bis (Allyl Carbonate) | Diethylene Glycol Bis + 12.5% (Allyl Carbonate) + 12.5% Diacrylate Urethane Oligomer | Diethylene Glycol Bis (Allyl Carbonate) + 25% Diacrylate Urethane Oligomer |
| Number of Castings broken in successive impacts with different diameter steel balls | 10/16 | 0 | 0 | 0 |
| | 11/16 | 0 | 0 | 0 |
| | 12/16 | 1 | 0 | 0 |
| | 13/16 | 4 | 1 | 0 |

TABLE III-continued

| | | Steel Ball Impact Test | | |
|---|---|---|---|---|
| Material | Diameter (inches) | Diethylene Glycol Bis (Allyl Carbonate) | Diethylene Glycol Bis + 12.5% (Allyl Carbonate) + 12.5% Diacrylate Urethane Oligomer | Diethylene Glycol Bis (Allyl Carbonate) + 25% Diacrylate Urethane Oligomer |
| | 14/16 | 4 | 5 | 0 |
| | 15/16 | 0 | 4 | 3 |
| | 16/16 | 0 | 0 | 0 |
| Number Surviving 16/16 inch steel balls | | 1 | 0 | 7 |

EXAMPLE IV

A series of tests were conducted to determine the Gardner steel ball impact strength of one eighth inch thick sheets.

Ten sheets were prepared by casting a solution of PPG Industries, Inc. CR-39 ® diethylene glycol bis(allyl carbonate) containing 3.5 weight percent isopropyl peroxydicarbonate between a pair of glass sheets separated by a one-eighth inch gasket.

Ten sheets were prepared by casting a solution of 87.5 weight percent PPG Industries, Inc. CR-39 ® diethylene glycol bis(allyl carbonate) and 12.5 weight percent Thiokol Chemical Co. UVITHANE ®-893 diacrylated urethane oligomer, basis total monomers, and 3.5 weight percent isopropyl peroxydicarbonate, basis weight of diethylene glycol bis(allyl carbonate), as described above.

Ten sheets were prepared by casting a solution of 75 weight percent PPG Industries, Inc. CR-39 ® diethylene glycol bis(allyl carbonate) and 25 weight percent Thiokol Chemical Co. UVITHANE ®-893 diacrylated urethane oligomer, basis total monomers, and 3.5 weight percent isopropyl peroxydicarbonate, basis weight of diethylene glycol bis(allyl carbonate), as described above.

All of the samples were cured according to the following cure cycle:

| Elasped Time (hours) | Temperature, °C. |
|---|---|
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

Each sheet was subjected to a Gardner Impact Strength Test, in which each sheet was subjected to an increasingly higher impact, until the sheet failed. The following results were obtained:

TABLE IV

Gardner Impact Tests of Flat Sheets (⅛")
Ft-lbs Required to Break Lenses Using Multiple Increasing Impacts
(an "X" denotes a sample break; a "—" denotes survival)

| 0.17 | 0.33 | 0.50 | 0.67 | 0.83 | 1.00 | 1.17 | 1.33 | 1.50 | 1.67 | Average Break Ft-lbs |
|---|---|---|---|---|---|---|---|---|---|---|
| PPG CR-39 ® Diethylene Glycol Bis(Allyl Carbonate) Homopolymer ||||||||||| |
| — | — | — | X | | | | | | | |
| — | — | X | | | | | | | | |
| — | — | X | | | | | | | | |
| — | — | — | — | — | X | | | | | |
| — | — | — | — | — | X | | | | | 0.63 |
| — | — | X | | | | | | | | |
| — | — | X | | | | | | | | |
| — | — | X | | | | | | | | |
| — | — | X | | | | | | | | |
| — | — | — | X | | | | | | | |
| 87.5% PPG CR-39 ® Diethylene Glycol Bis(Allyl Carbonate) + 12.5% Thiokol "UVITHANE" 893 Polyurethane with Terminal Acrylate Functionality ||||||||||| |
| — | — | — | — | — | — | — | X | | | |
| — | — | — | — | — | — | — | X | | | |
| — | — | — | — | X | | | | | | 1.1 |
| — | — | — | — | — | — | — | X | | | |
| — | — | | | X | | | | | | |
| — | — | — | — | — | X | | | | | |
| — | — | — | — | — | — | — | X | | | |
| — | — | — | — | X | | | | | | |
| — | — | — | — | — | — | X | | | | |
| 75% PPG CR-39 ® Diethylene Glycol Bis(Allyl Carbonate) + 25% Thiokol "UVITHANE" 893 Polyurethane with Terminal Acrylate Functionality ||||||||||| |
| — | — | — | — | X | | | | | | |
| — | — | — | — | — | — | — | — | — | X | |

TABLE IV-continued

Gardner Impact Tests of Flat Sheets (⅛")
Ft-lbs Required to Break Lenses Using Multiple Increasing Impacts
(an "X" denotes a sample break; a "—" denotes survival)

| 0.17 | 0.33 | 0.50 | 0.67 | 0.83 | 1.00 | 1.17 | 1.33 | 1.50 | 1.67 | Average Break Ft-lbs |
|------|------|------|------|------|------|------|------|------|------|----------------------|
| —    | —    | —    | —    | —    | —    | —    |      |      |      | 1.3                  |
| —    | —    | —    | —    | —    | —    | —    | —    | X    |      |                      |
| —    | —    | —    | —    | —    | —    | —    | X    |      |      |                      |
| —    | —    | —    | —    | —    | —    | X    |      |      |      |                      |
| —    | —    | —    | —    | —    | —    | X    |      |      |      |                      |
| —    | —    | —    | —    | —    | —    | —    | —    | —    | X    |                      |
| —    | —    | —    | —    | —    | —    | X    |      |      |      |                      |
| —    | —    | —    | —    | —    | —    | X    |      |      |      |                      |

While the invention has been described with respect to certain preferred exemplifications and embodiments, the scope of the invention is not to be limited thereby, but is solely defined by the claims appended hereto.

We claim:

1. A copolymer of
    (A) an aliphatic diol bis(allyl carbonate) having the formula

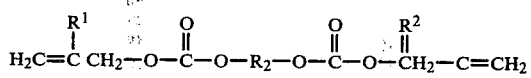

where $R^1$ and $R^2$ are independently chosen from the groups consisting of hydrogen, Cl, F, Br, and $C_1$ to $C_4$ alkyl groups, and $R_2$ is chosen from the group consisting of alkylene groups, alkylene ether groups, alkylene polyether groups, and alkylene carbonate groups; and
    (B) a polyurethane having terminal acrylate functionality.

2. The copolymer of claim 1 wherein the polyurethane has the formula chosen from the group consisting of

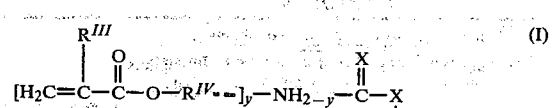

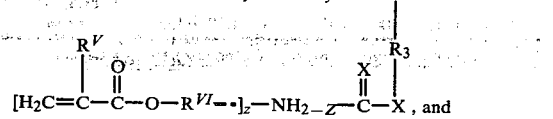

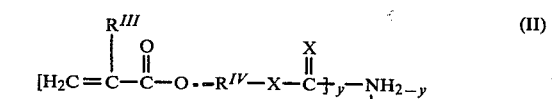

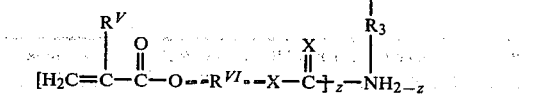

where $R^{III}$ and $R^V$ are independently chosen from the group consisting of H and —CH$_3$, $R^{IV}$ and $R^{VI}$ are independently chosen from the group consisting of $C_1$ to $C_{10}$ alkyls, m and n are independently integers from 1 to 10, y and z are independently 1 or 2, and x is chosen from the group consisting of oxygen and sulfur.

3. The copolymer of claim 2 wherein $R_3$ is a discretionary grouping of the form

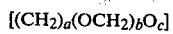

where a is an integer from 2 to 20, b is 0 or an integer from 1 to 3, and c is 0 or an integer from 1 to 10.

4. The copolymer of claim 3 wherein $R^{III}$ and $R^V$ are each hydrogen, $R^{IV}$ and $R^{VI}$ are independently selected from the group consisting of —CH$_2$—, and —C$_2$H$_4$, y and z are independently 1 or 2, and $R_3$ is an alkylene polyether having the formula

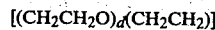

where d is an integer from 1 to 5.

5. The copolymer of claim 2 wherein $R^1$ and $R^2$ are H, and $R_2$ is an alkylene polyether having the formula

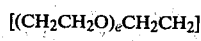

where e is an integer from 1 to 3.

6. The copolymer of claim 2 wherein $R_3$ is a polyurethane group.

7. The copolymer of claim 1 wherein the copolymer contains from about 75 to about 95 weight percent aliphatic diol bis(allyl carbonate), balance polyurethane having terminal acrylate functionality, basis weight of the total aliphatic diol bis(allyl carbonate) and polyurethane.

8. A liquid composition comprising:
    (A) an aliphatic diol bis(allyl carbonate) having the formula

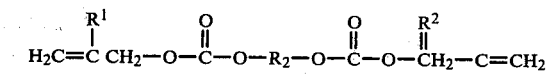

where $R^1$ and $R^2$ are independently chosen from the groups consisting of hydrogen, Cl, F, Br, and $C_1$ to $C_4$ alkyl groups, and $R_2$ is chosen from the group consisting of alkylene groups, alkylene ether groups, alkylene polyether groups, and alkylene carbonate groups; and
    (B) a polyurethane having terminal acrylate functionality.

9. The composition of claim 8 wherein the polyurethane has the formula chosen from the group consisting of

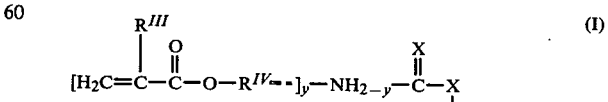

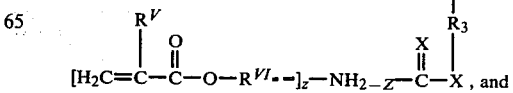

-continued $$[H_2C=\overset{R^{III}}{\underset{|}{C}}-\overset{O}{\underset{\|}{C}}-O\cdots R^{IV}-X-\overset{X}{\underset{\|}{C}}\!\!+_y-NH_{2-y} \atop [H_2C=\overset{R^V}{\underset{|}{C}}-\overset{O}{\underset{\|}{C}}-O\cdots R^{VI}\cdots X-\overset{X}{\underset{\|}{C}}\!\!+_z-\overset{R_3}{\underset{|}{N}}H_{2-z}]\quad (II)$$

where $R^{III}$ and $R^V$ are independently chosen from the group consisting of H and —CH$_3$, $R^{IV}$ and $R^{VI}$ are independently chosen from the group consisting of C$_1$ to C$_{10}$ alkyls, m and n are independently integers from 1 to 10, y and z are independently 1 or 2, and x is chosen from the group consisting of oxygen and sulfur.

10. The composition of claim 9 wherein R$_3$ is a discretionary grouping of the form $$[(CH_2)_a(OCH_2)_bO_c]$$

where a is an integer from 2 to 20, b is 0 or an integer from 1 to 3, and c is 0 or an integer from 1 to 10.

11. The composition of claim 10 wherein $R^{III}$ and $R^V$ are each hydrogen, $R^{IV}$ and $R^{VI}$ are independently selected from the group consisting of —CH$_2$—, and —C$_2$H$_4$—, y and z are independently 1 or 2, and R$_3$ is an alkylene polyether having the formula $$[(CH_2CH_2O)_d(CH_2CH_2)]$$

where d is an integer from 1 to 5.

12. The composition of claim 9 wherein R$^1$ and R$^2$ are H, and R$_2$ is an alkylene polyether having the formula $$[(CH_2CH_2O)_eCH_2CH_2]$$

where e is an integer from 1 to 3.

13. The composition of claim 9 wherein R$_3$ is a polyurethane group.

14. The composition of claim 8 containing from about 75 to about 95 weight percent aliphatic diol bis(allyl carbonate), balance polyurethane, basis weight of the total aliphatic diol bis(allyl carbonate) and polyurethane.

15. A method of increasing the impact strength of diol bis(allyl carbonate) polymerizates comprising adding an effective amount of a polyurethane having terminal acrylate functionality to the diol bis(allyl carbonate), and thereafter polymerizing the resulting composition.

16. The method of claim 15 wherein the polyurethane has the formula chosen from the group consisting of $$[H_2C=\overset{R^{III}}{\underset{|}{C}}-\overset{O}{\underset{\|}{C}}-O-R^{IV}\cdots]_y-NH_{2-y}-\overset{X}{\underset{\|}{C}}-X \atop [H_2C=\overset{R^V}{\underset{|}{C}}-\overset{O}{\underset{\|}{C}}-O-R^{VI}\cdots]_z-NH_{2-z}-\overset{R_3}{\underset{|}{C}}-X\,,\text{ and}\quad (I)$$

$$[H_2C=\overset{R^{III}}{\underset{|}{C}}-\overset{O}{\underset{\|}{C}}-O\cdots R^{IV}-X-\overset{X}{\underset{\|}{C}}\!\!+_y-NH_{2-y} \atop [H_2C=\overset{R^V}{\underset{|}{C}}-\overset{O}{\underset{\|}{C}}-O\cdots R^{VI}\cdots X-\overset{X}{\underset{\|}{C}}\!\!+_z-\overset{R_3}{\underset{|}{N}}H_{2-z}]\quad (II)$$

where $R^{III}$ and $R^V$ are independently chosen from the group consisting of H and —CH$_3$, $R^{IV}$ and $R^{VI}$ are independently chosen from the group consisting of C$_1$ to C$_{10}$ alkyls, m and n are independently integers from 1 to 10, y and z are independently 1 or 2, and x is chosen from the group consisting of oxygen and sulfur.

17. The method of claim 16 wherein R$_3$ is a discretionary grouping of the form $$[(CH_2)_a(OCH_2)_bO_c]$$

where a is an integer from 2 to 20, b is 0 or an integer from 1 to 3, and c is 0 or an integer from 1 to 10.

18. The method of claim 17 wherein $R^{III}$ and $R^V$ are each hydrogen, $R^{IV}$ and $R_{VI}$ are independently selected from the group consisting of —CH$_2$—, and —C$_2$H$_4$, y and z are independently 1 or 2, and R$_3$ is an alkylene polyether having the formula $$[(CH_2CH_2O)_d(CH_2CH_2)]$$

where d is an integer from 1 to 5.

19. The method of claim 16 wherein R' and R" are H, and R$_2$ is an alkylene polyether having the formula $$[(CH_2CH_2O)_eCH_2CH_2]$$

where e is an integer from 1 to 3.

20. The method of claim 16 wherein R$_3$ is a polyurethane group.

21. The method of claim 15 wherein the copolymer contains from about 75 to about 95 weight percent aliphatic diol bis(allyl carbonate), balance polyurethane, basis weight of the total aliphatic diol bis(allyl carbonate) and polyurethane.

22. A copolymer of a polyol (allyl carbonate) and a polyurethane having terminal acrylate functionality.

23. A liquid composition comprising a polyol (allyl carbonate) and a polyurethane having terminal acrylate functionality.

24. A method of increasing the impact strength of a polyol(allyl carbonate) comprising adding an effective amount of a polyurethane having terminal acrylate functionality to the monomeric polyol (allyl carbonate) and thereafter polymerizing the resulting composition.

* * * * *